(12) United States Patent
Li et al.

(10) Patent No.: US 8,404,347 B2
(45) Date of Patent: Mar. 26, 2013

(54) METHOD OF SYNTHESIS OF AMPHIPHILIC MAGNETIC COMPOSITE PARTICLES

(75) Inventors: Pei Li, Hong Kong (CN); Kin Man Ho, Hong Kong (CN)

(73) Assignee: Hong Kong Polytechnic University, Kowloon, Hong Kong (CN)

( * ) Notice: Subject to any disclaimer, the term of this patent is extended or adjusted under 35 U.S.C. 154(b) by 821 days.

(21) Appl. No.: 12/359,393

(22) Filed: Jan. 26, 2009

(65) Prior Publication Data

US 2010/0190006 A1 Jul. 29, 2010

(51) Int. Cl.
*B32B 15/02* (2006.01)
*B05D 7/02* (2006.01)
*C08K 9/00* (2006.01)

(52) U.S. Cl. .................. 428/407; 428/402.24; 428/403; 428/404; 428/405; 427/222; 523/201; 523/209; 523/210

(58) Field of Classification Search .................. 427/222, 427/127, 132, 128; 428/403, 212, 405, 407, 428/694, 695, 900; 523/201; 430/106.6, 430/107, 138, 98, 124, 108
See application file for complete search history.

(56) References Cited

U.S. PATENT DOCUMENTS

| | | | | |
|---|---|---|---|---|
| 5,856,379 | A * | 1/1999 | Shiratsuchi et al. | ......... 523/209 |
| 6,204,033 | B1 | 3/2001 | Müller-Schulte | |
| 6,255,477 | B1 | 7/2001 | Kleiber et al. | |
| 6,514,688 | B2 | 2/2003 | Müller-Schulte | |
| 6,573,313 | B2 | 6/2003 | Li et al. | |
| 2002/0143081 | A1 * | 10/2002 | Li et al. | ........................ 523/201 |

FOREIGN PATENT DOCUMENTS

| | | | |
|---|---|---|---|
| JP | 08-176461 | * | 7/1996 |
| WO | WO 96/41811 A1 | | 12/1996 |
| WO | WO 98/12717 A1 | | 3/1998 |

OTHER PUBLICATIONS

Bourgeat-Lami, E. Organic/Inorganic Nanocomposite Colloids. Encyclopedia of Nanoscience and Nanotechnology, 2004, vol. 8, p. 305-332.*
Ai, H. et al., "Magnetite-Loaded Polymeric Micelles as Ultrasensitive Magnetic-Resonance Probes", *J. Adv. Mater.* 2005, 17, pp. 1949-1952.
Aida, Y. et al., "Removal of endotoxin from protein solutions by phase separation using Triton X-114", *J. Immunol. Meth.* 132, (1990), pp. 191-195.
Berensmeier, S. "Magnetic particles for the separation and purification of nucleic acids", *Appl. Microbiol. Biotechnol* (2006), 73, pp. 495-504.

(Continued)

*Primary Examiner* — James J Seidleck
*Assistant Examiner* — S. Camilla Pourbohloul
(74) *Attorney, Agent, or Firm* — Leydig, Voit & Mayer, Ltd.

(57) ABSTRACT

Amphiphilic, magnetic composite particles are comprised of cores and shells. The core contains both hydrophobic vinylic graft copolymer, hydrophobic vinylic homopolymer and magnetic nanoparticles, and the shell to which the hydrophobic vinylic polymer is grafted is a hydrophilic, nitrogen-containing polymer. Typically, the composite particles are made by a process which involves generating radicals on nitrogen atoms of the water-soluble polymer, and then initiating free-radical copolymerization of said vinylic monomer(s) and vinylic-coated magnetic nanoparticles, whereby vinylic polymer(s) undergo(es) phase separation and the vinylic coated magnetic nanoparticles are encapsulated within the vinylic polymer to form a composite latex.

19 Claims, 6 Drawing Sheets

OTHER PUBLICATIONS

Bergemann, C. et al., "Magnetic ion-exchange nano- and microparticles for medical, biochemical and molecular biological applications", *J. Magn. and Magn. Mater* 194, (1999), pp. 45-52.

Berry, C. C. et al., "Dextran and album, derivatised iron oxide nanopartcles: influence on fibroblast in vitro", *Biomaterials* 24, (2003), pp. 4551-4557.

Berry, C. C. et al., "Functionalisation of Magnetic Nanoparticles for Applications in Biomedicine" *J. Phys. D: Appl. Phys.* 36, (2003), pp. R198-R206.

Caruso, F. et al., "Magnetic Core-Shell Particles: Preparation of Magnetic Multilayers on Polymer Latex Microspheres", *Adv. Mater* 1999, 11, pp. 950-953.

Chiang, C-L. et al., "Application of superparamagnetic nanoparticles in purification of plasmid DNA from bacterial cells", *J. Chromatography* B, 822, (2005), pp. 54-60.

Chung, D. D. L. "Electromagnetic inference shielding effectiveness of carbon materials", *Carbon* 39, (2001), pp. 279-285.

Deng, Y. H. et al., "A Novel Approach for Preparation of Thermoresponsive Polymer Magnetic Microspheres with Core-Shell Structure", *Adv. Mater* (Oct. 16, 2003), 15, No. 20, pp. 1729-1732.

Denkbas, E. B. et al., "Magnetic chitosan microspheres: preparation and characterization", *Reactive and Functional Polymers*. 50, (2002), pp. 225-232.

Derfus, A. M. et al., "Remotely Triggered Release from Magnetic Nanoparticles", *Adv, Mater* 2007, 19, pp. 3932-3936.

Dresco, P. A. et al., "Preparation and Properties of Magnetite and Polymer Magnetite Nanoparticles", *Langmuir* 1999, 15, pp. 1945-1951.

Dyal, A. et al., "Activity of *Candida rugosa* Lipase Immobilized on $\gamma\text{-Fe}_2\text{O}_3$ Magnetic Nanoparticles", *J. Am. Chem. Soc.* 2003, 125, pp. 1684-1685.

Fraker, D. L. et al., "Tolerance to Tumor Necrosis Factor in Rats and the Relationship to Endotoxin Tolerance and Toxicity", *J. Exp. Med.* vol. 168, (Jul. 1988), pp. 95-105.

Gu, S. et al., "Synthesis of monodisperse, magnetic latex particles with polystyrene core", *Colloid Polym. Sci.* (2003), 281, pp. 1076-1081.

Gupta, A. K. et al., "Synthesis and surface engineering of iron oxide nanoparticles for biomedical applications", *Biomaterials* 26, (2005), pp. 3995-4021.

Gupta, A. K. et al., "Surface modified superparamagnetic nanoparticles for drug delivery: Interaction studies with human fibroblast in culture", *J. Mater Sci.: Mat in Med.*, 15, (2004), pp. 493-496.

Ho, K. et al., "Design and Synthesis of Novel Magnetic Core-Shell Polymeric Particles", *Langmuir* 2008, 24, pp. 1801-1807.

Hong, Y. et al., "Electromagnetic interference shielding characteristics of fabric complexes coated with conductive polypyrrole and thermally evaporated Ag", *Curr. Appl. Phys.*, 1, (2001), pp. 439-442.

Jin, L. et al., "Alignment of carbon nanotubes in a polymer matrix by mechanical stretching", *Applied Physics Letters*, vol. 73, No. 9, pp. 1197-1199, (Aug. 31, 1998).

Kim, J. et al., "A Magnetically Separable, Highly Stable Enzyme System Based on Nanocomposites of Enzymes and Magnetic Nanoparticles Shipped in Hierarchically Ordered, Mesocellular, Mesoporous Silica", *Small*, 2005, 1, No. 12, pp. 1203-1207.

Kronick, P. L. et al., "Magnetic Microspheres Prepared by Redox Polymerization Used in a Cell Separation Based on Gangliosides", *Science*, New Series, vol. 200, No. 4345 (Jun. 2, 1978), pp. 1074-1076.

Langer, R. "New Methods of Drug Delivery" *Science*, New Series, vol. 249, No. 4976 (Sep. 28, 1980), pp. 1527-1533.

Li, N. et al., "Electromagnetic Interference (EMI) Shielding of Single-Walled Carbon Nanotube Epoxy Composites", *Nano Letters*, vol. 6, No. 6, 2006, pp. 1141-1145.

Lin, Y. S. et al. "Multifunctional Composite Nanoparticles: Magnetic, Luminescent, and Mesoporous", *Chem. Mater* 2006, 18, pp. 5170-5172.

Lu, An-Hui et al., "Magnetic Nanoparticles: Synthesis, Protection, Functionalization, and Application", *Angew. Chem. Int. Ed.* 2007, 46, pp. 1222-1244.

Lu, A. H. et al., "Fabrication of Magnetically Separable Mesostructured Silica with an Open Pore System", *J. Am. Chem. Soc.* 2004, 126, pp. 8616-8617.

McCarthy, B. et al., "A Microscopic and Spectroscopic Study of Interactions between Carbon Nanotubes and a Conjugated Polymer", *J Phys. Chem. B* 2002, 106, pp. 2210-2216.

Moniruzzaman, M. et al., "Polymer Nanocomposites Containing Carbon Nanotubes", *Macromolecules* 2006, 39, pp. 5194-5205.

Morrison, D. C. et al., "Binding of Polymyxin B to the Lipid A Portion of Bacterial Lipopolysaccharides", *Immunochemistry*, vol. 13, 1976, pp. 813-818.

Pankhurst, Q. A. et al., "Applications of Magnetic Nanoparticles in Biomedicine", *J. Phys. D: Appl. Phys.* 36 (2003), pp. R167-R181.

Qian, D. et al., "Load transfer and deformation mechanisms in carbon nanotube-polystyrene composites", *Applied Physics. Letters*, vol. 76, No. 20, (May 15, 2000), pp. 2868-2870.

Ramirez, L. P. et al., "Magnetic Polystyrene Nanoparticles with a High Magnetite Content Obtained by Miniemulsion Processes", *Macromol. Chem. Phys.* 2003, 204, No. 1, pp. 22-31.

Saoud, F. M. et al., "Magnetic Nanoparticles for the Preparation of Ultrapure RAFT Polymers", *Macromolecules* 2008, 41, pp. 1598-1600.

Sauzedde, F. et al., "Hydrophilic magnetic polymer latexes. 1. Adsorption of magnetic iron oxide nanoparticles onto various cationic latexes", *Colloid Polym. Sci.* 277, (1999), pp. 846-855.

Shaffer M. S. P. et al., "Fabrication and Characterization of Carbon Nanotaube/Poly(vinyl alcohol) Composites", *Adv. Mater*, 1999, 11, pp. 937-941.

Shan, G. B. et al., "Immobilization of *Pseudomonas delafieldii* with magnetic polyvinyl alcohol beads and its application in biodesulfurization", *Biotechnology Letters*, 25, 2003,pp. 1977-1981.

Shibatani, T. et al., "Purification of High Molecular Weight Urokinase from Human Urine and Comparative Study of Two Active Forms of Urokinase", *Thromb Haemostas(Stuttgart)* 49, (2), 1983, pp. 91-95.

Sweadner, K. J. et al., "Filtration Removal of Endotoxin (Pyrogens) in Solution in Different States of Aggregation", *Applied Environ. Microbiology* (Oct. 1977), 34, pp. 382-385.

Tartaj, P. et al., "The Preparation of Magnetic Nanoparticles for Applications in Biomedicine" *J. Phys.* D: Appl. Phys. 36, (2003), pp. R182-R197.

Ugelstad, J. et al., "Preparation and Application of New Monosized Polymer Particles", *Prog. Polym. Sci*, vol. 17, 1992, pp. 87-161.

Won, J. et al., "A Magnetic Nanoprobe Technology for Detecting Molecular Interactions in Live Cells", *Science* 309, (Jul. 1, 2005), pp. 121-125.

Yavuz, C. T. et al., "Low-Field Magnetic Separation of Monodisperse $Fe_3O_4$ Nanocrystals", *Science* 314, (Nov. 10, 2006), pp. 964-967.

Zhang, L. et al., "Magnetic Hollow Spheres of Periodic Mesoporous Organosilica and $Fe_3O_4$ Nanocrystals: Fabrication and Structure Control", *Adv. Mater.* 2008, 20, pp. 805-809.

Zhang, Y. et al., "Surface modification of superparamagnetic magnetite nanoparticles and their intracellualr uptake", *Biomaterials* 23, (2002), pp. 1553-1561.

* cited by examiner

METHOD OF SYNTHESIS OF AMPHIPHILIC MAGNETIC COMPOSITE PARTICLES

FIELD OF THE INVENTION

The present invention relates to amphiphilic magnetic composite particles, and to a process of making amphiphilic magnetic composite particles.

BACKGROUND TO THE INVENTION

There is an increasing interest in magnetic particles because of their wide application in such fields as biotechnology, biomedical, electromagnetics, magnetic storage and coating to name just a few. Various approaches to the preparation of magnetic particles have been investigated including co-precipitation of ferrous and ferric salts under alkaline conditions in the presence of either polymers or surfactants, crosslinking of functional polymer in an emulsifier-stabilized magnetic nanoparticle dispersion and layer-by-layer (LBL) self-assembly of alternating layers of polyelectrolytes and magnetic nanoparticles onto colloidal templates.

Despite of the success of these, and other, approaches in preparing the magnetic particles, there are still some major drawbacks with respect to the methods and the properties of the particles produced. For example, synthesis involves tedious multiple step reactions and the use of large amounts of toxic solvent agents, emulsifiers and surfactants. Leaching of magnetic nanoparticles from the polymeric particles and nanoparticle dissolution in acidic medium are still serious concerns. In addition, magnetic polymeric particles produced through these approaches generally have broad size distributions and usually lack of surface functional groups, which are highly desirable for further chemical modifications.

SUMMARY OF THE INVENTION

The present invention provides amphiphilic, magnetic composite particles comprising a core and shell. The core contains both hydrophobic vinylic graft copolymer, hydrophobic vinylic homopolymer and vinylic coated magnetic nanoparticles, and the shell to which the hydrophobic vinylic polymer is grafted is a hydrophilic, nitrogen-containing polymer.

The present invention further provides a method of making magnetic composite particles comprising the generation of radicals on nitrogen atoms of the water-soluble polymer, and initiation of free-radical copolymerization of vinylic monomer(s) and vinylic-coated magnetic nanoparticles, whereby vinylic polymer(s) undergo(es) phase separation and the vinylic coated magnetic nanoparticles are encapsulated within the vinylic polymer to form a composite latex. The method does not use any surfactants, emulsifiers or toxic solvent agents. The method also provides for the making of magnetic composite particles with different polymer cores, such as hard, soft or temperature sensitive.

BRIEF DESCRIPTION OF THE DRAWINGS

The invention will now be described by way of example only and with reference to the accompanying drawings in which:

FIG. 9($a$) shows a transmission electron micrograph of a magnetic composite particle according to the invention and FIG. 9($b$) is a graph of particle size distribution of magnetic composite particles according to the invention, wherein the hydrophobic core contains PMMA and vinylic coated gamma-phase iron oxide nanoparticles.

DETAILED DESCRIPTION OF THE INVENTION

Figure 1:
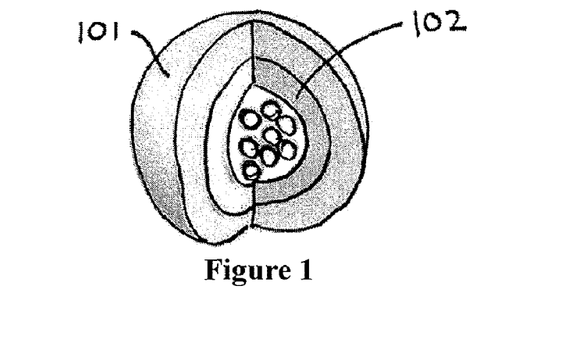
FIG. 1 illustrates a magnetic composite particle according to the invention.

FIG. 1 illustrates a preferred amphiphilic magnetic composite particle according to the invention. The particle contains a shell 101 and a core 102.

The shell 101 is a hydrophilic, nitrogen containing compound, such as a polymer, which can be natural or synthetic. The nitrogen can be present as an amino group. Primary amine (—$NH_2$), secondary amine (—NRH), and tertiary amine (—$NR_2$) are examples of functional groups for this reaction. Structurally, the amino-containing polymers may be in the form of cyclic aliphatic or linear or aromatic amine. The amino function may be located in the polymer main chain or in the side chain. Examples of the nitrogen-containing compounds include natural amino polymers such as N-acetyl sugars such as chitosan, or proteins such as casein, gelatin, bovine serum albumin, and cellulase, and synthetic amino polymers such as polyethyleneimine, poly(vinyl amine)-co-poly(vinyl alcohol)poly(vinyl amine)-co-poly(acrylonitrile), etc. In the preferred embodiment, the nitrogen containing compound used in the shell is made of chitosan.

The core 102 is composed of a grafted copolymer of the hydrophobic vinylic monomer, and homopolymer of a hydrophobic vinylic monomer or a mixture of two or more hydrophobic vinylic monomers or hydrophobic temperature sensitive polymers of a hydrophilic monomer, and encapsulated vinylic coated magnetic nanoparticles. The vinylic polymer is prepared using a vinylic monomer. The nature of the monomer can be, for example a vinylic monomer, an acrylate monomer, an acrylamide monomer, polymerizable nitrile, acetate, chloride monomers, a styrenic monomer, N-substituted acrylamide monomers. Examples of vinylic monomers include those of formula $R^1R^2C=CH_2$, where $R^1$ is hydrogen or alky, and where $R^2$ is alkyl, aryl, heteroaryl, halo, cyano, or other suitable hydrophobic group. Groups for $R^1$ can include hydrogen and methyl. Group for $R^2$ include $C_1$-$C_6$ alkyl; phenyl; monocyclic heteroaryl with 4 to 8 ring atoms, more preferably 5 or 6 ring atoms, and with 1, 2 or 3 ring heteratoms, preferably 1 or 2, more preferably 1 ring atom, selected from nitrogen, oxygen, or sulfur; chloro; and cyano. Examples of acrylate monomers include those of formula $CH_2=CR^3COOR^4$, where $R^3$ is hydrogen or alkyl, and where $R^4$ is alkyl or substituted allyl, or other suitable hydrophobic group. Groups for $R^3$ include hydrogen and methyl. Group for $R^4$ include $C_1$-$C_{16}$, for example $C_1$-$C_{12}$ alkyl which may be straight-chain or branched, and such groups substituted with one or more substituents chosen from unsubstituted amino, monosubstituents amino or disubstituted amino, hydroxy, carboxy, or other usual acrylate substituent. Acrylate monomers can comprise ethyl(meth)acrylate, isopropyl(meth) acrylate, n-butyl(meth)acrylate, etc. Examples of acrylamide monomers include those of formula $CH_2=CR^3COONHR^4$, where $R^3$ and $R^4$ as defined. Examples of N-substituted include those of formula $CH_2=CR^1CONR^2$, where $R^1$ is hydrogen or alkyl and $R^2$ is alkyl or substituted alkyl or another suitable hydrophobic group. Examples of encapsulated magnetic nanoparticles includes those of formula $MO.Fe_2O_3$, where M is iron, nickel, cobalt, manganese, copper and platinum. In preferred embodiment, the core is composed of poly(methyl methacrylate) and vinylic coated maghemite nanoparticles.

The magnetic composite particles according to the invention are made by firstly preparing the magnetic nanoparticles. Secondly coating the surface of the nanoparticles with a vinyl surface coating. And thirdly, the vinyl surface coated magnetic nanoparticles are encapsulated via the peroxide-induced graft copolymerization of vinylic monomer(s) from water soluble polymer containing amino groups in the presence of vinylic coated magnetic nanoparticles.

The first step of preparing the magnetic nanoparticles is achieved as follows. Two metal salts are dissolved in de-ionized water, the resulting solution is mixed with an alkaline solution under vigorous stirring, and the solution is allowed to react for 1 h at room temperature, and reflux for another 1 hour to form magnetic nanoparticles. In one embodiment, iron(II)chloride and iron(III)chloride are dissolved in de-ionized water. The metal salts comprise ferromagnetic elements selected from the group consisting of ferrites that have formula $MO.Fe_2O_3$, where M is iron, nickel, cobalt, manganese, copper and platinum. The surface of magnetic nanoparticles is coated with carboxylic acid to form acid modified magnetic nanoparticles. Adding a carboxylic acid can include for example trisodium citrate, gluconic acid sodium salt, sodium oleate, and lauric acid. In one embodiment, trisodium citrate in a 0.2 molar concentration of total volume is added.

Figure 2:
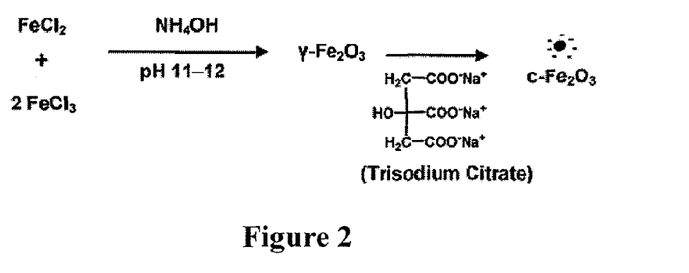
FIG. 2 illustrates a first of three preferred steps in making amphiphilic magnetic composite particles according to the invention.

A preferred example of this first step shown in FIG. 2. $FeCl_2,4H_2O$ (1.99 g) and anhydrous $FeCl_3$ (3.25 g) are dissolved in water (20 mL) separately, and mixed under vigorous stirring. A $NH_4OH$ solution (0.6 M, 200 mL) is then added the stirring mixture at room temperature, immediately followed by the addition of a concentrated $NH_4OH$ solution (25 w/w %, 30 mL) to maintain the reaction pH between 11 and 12. The resulting black dispersion is continuously stirred for 1 hour at room temperature and then heated to reflux for 1 hour to yield a brown dispersion. The magnetic nanoparticles are then purified by a repeated centrifugation (3000-6000 rpm for 20 min), decantation, and redispersion cycle for 3 times until a stable brown magnetic dispersion is obtained. A total of 100 mL of the $\gamma$-$Fe_2O_3$ nanoparticle dispersion (2.42 w/w %) prepared as stated previously was acidified with a $HNO_3$ solution (4 M, 100 mL) and then centrifuged at 3000 rpm for 20 min to collect the magnetic nanoparticles. The collected magnetic nanoparticles were redispersed in water (200 mL), and the dispersion was heated to reflux. Trisodium citrate dihydrate (11.7 g) was then added, followed by heating the mixture for 1 hour under reflux to produce citrate-coated iron oxide nanoparticles. The brown dispersion was purified by being placed into a dialysis tube (10 kDa molecular weight cutoff, Sigma-Aldrich) and dialyzed against water for 8 days with a daily change of water until the conductivity of water was comparable to that of purified $H_2O$ used.

The second step of coating the surface of the nanoparticles with a vinyl surface coating is achieved as follows. The acid modified magnetic nanoparticles are treated with an alkaline solution and mixed with silanol precursor, the resulting solution is allowed to react at 40° C. for 24 h. Adding a silanol precursor can include tetramethyl orthosilicate (TMOS), tetraethyl orthosilicate (TEOS), mtetrapropyl orthosilicate, (TPOS), tetrabutyl orthosilicate (TBOS), methyl polysilicate, ethyl polysilicate, etc. In one embodiment, tetraethyl orthosilicate in a molar concentration from 0.02 to 0.16 M is added. The resulting mixture is subsequently mixed with a silane coupling agent containing vinylic groups in a alcohol/water mixture, preferably 4 to 1 volume ratio, and the mixture is allowed to react at 40° C. for 24 h to form vinylic coated magnetic nanoparticles. The silane coupling agent comprises (3-triethoxysilyl)propyl methacylate (MPS), (3-methyldiethoxysilyl)propyl methacrylate, (3-triethoxysilyl)propyl 2-propenoate, (trimethoxysilyl)methyl methacrylate, (triethyoxysilyl)methyl methacylate, etc. In one embodiment, 3-(trimethoxysilyl)propylmethacrylate in a molar concentration from 0.2 to 0.8 M is added.

Figure 3:
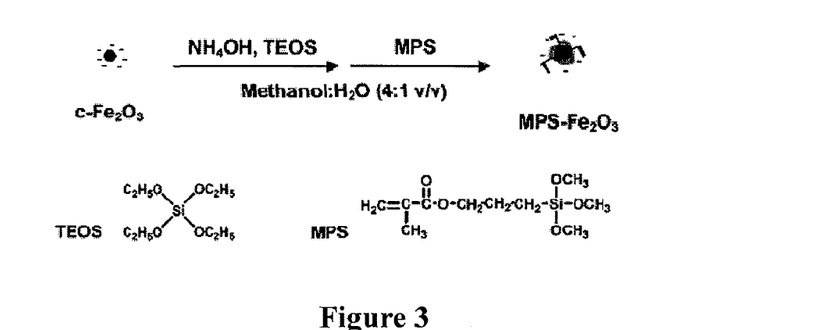
FIG. 3 illustrates the second preferred step in making the vinylic coated magnetic nanoparticles.
Figure 4:
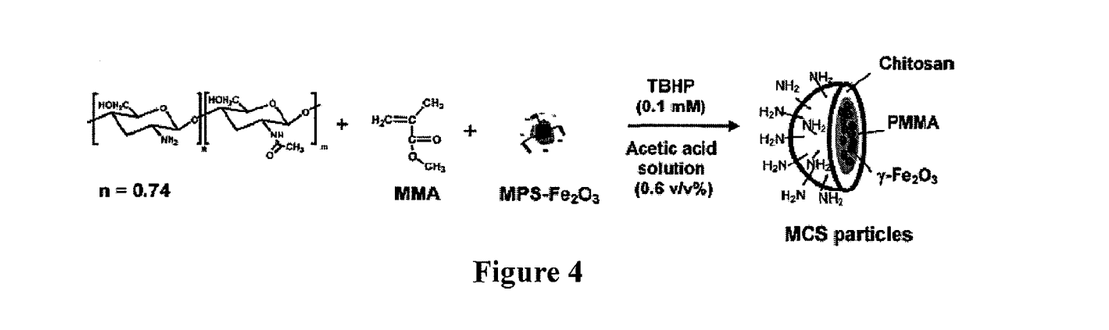
FIG. 4 illustrates the third, and final, preferred step in making the magnetic composite particles.

A preferred example of this second step shown in FIG. 3. The $\gamma$-$Fe_2O_3$ nanoparticles were first obtained as described with reference to FIG. 2. A layer of a silanol precursor is coated on the surface of the $\gamma$-$Fe_2O_3$ nanoparticles by premixing a dispersion of the purified citrate-coated nanoparticles (8.5 w/w %, 20 mL) with methanol (80 mL) for 1 hour at 40° C. Concentrated ammonia solution (25 w/w %, 1.8 mL) is added and the resulting mixture is stirred at 40° C. for 30 min. Subsequently, tetraethyl orthosilicate (TEOS, 1.0 mL) is charged to the reaction vessel and the mixture is continuously stirred at 40° C. for 24 hours. Finally, 3-(trimethoxysilyl) propyl methacrylate (MPS, 5.3 mL) is added and the mixture is allowed to react at 40° C. for 24 hours to give vinyl-coated $\gamma$-$Fe_2O_3$ nanoparticles. The vinylic-coated nanoparticles were collected by placing a permanent magnet (4 Tesla) next to the container wall, followed by discarding the solution. The collected magnetic nanoparticles were redispersed in ethanol (20 mL) and the dispersion was transferred into a dialysis tube (10 kDa molecular weight cutoff, Sigma-Aldrich) and dialyzed against ethanol for 1 week with a daily change of ethanol to remove the unreacted MPS, TEOS, and $NH_3$. The amounts of unreacted MPS molecules removed through the dialysis were monitored with ultraviolet (UV) measurements using a PerkinElmer UV-vis spectrophotometer (Lambda 35) at 203.5 nm. Finally, the purified dispersion was concentrated to a 10.0 w/w % solid content for subsequent reactions.

The third step of encapsulating the vinyl surface coated nanoparticles is achieved as follows. A nitrogen containing compound is dissolved in an aqueous medium, the resulting solution is then mixed with the vinylic coated magnetic nanoparticles and a vinylic monomer or a mixture of two or more monomers. A catalyst is added, and the solution is allowed to react at 80° C. for 2 h. The nitrogen containing compound can be dissolved in an aqueous medium such as water, acid or other appropriate system chosen to suit the polymer or protein, such as having an appropriate pH and temperature. In one embodiment, chitosan is dissolved in a 1% acetic acid solution.

The resulting solution can be mixed with vinylic coated magnetic nanoparticles, and vinylic monomer or a mixture of monomers in a weight ratio of monomer to vinylic coated magnetic nanoparticles to nitrogen containing compound of 4:1:2.5 to 8:1:2.5, preferably 4:1:2.5 to 6:1:2.5. In one embodiment, there is 63% vinylic monomer, 11% vinylic coated magnetic nanoparticles and 26% nitrogen containing compound.

Adding a catalyst can include adding for example, alkyl hydroperoxide, and hydrogen peroxide.

Alkyl hydroperoxides such as t-butyl hydroperoxide (TBHP), cumene hydroperoxide, p-isopropyl cumene hydroperoxide, p-menthane hydroperoxide and pinane hydroperoxide are suitable initiating agents to induce the graft copolymerization of a vinylic monomer from the water-soluble polymers. Hydrogen peroxide ($H_2O_2$) is also suitable initiating agents to induce the graft copolymerization of a vinylic monomer from the water-soluble polymers. Grafting efficiency of chitosan graft initiated by $H_2O_2$ is comparable to that initiated by TBHP.

Radical initiators such as tert-butyl hydroperoxide and hydrogen peroxide have been carefully investigated for the graft copolymerization of, for example, methyl methacrylate (MMA), a hydrophobic monomer from chitosan in the presence of vinylic coated magnetic nanoparticles. Results are listed in Table 1.

A preferred example of this third step is shown in FIG. 3. For a total of 25 mL of solution, 1 mL of vinylic coated grama-phase iron oxide nanoparticle dispersion (10 w/w % in ethanol) was mixed with ethanol and then with 22 mL of chitosan solution containing 0.25 g of chitosan and 0.6 v/v % acetic acid (99 w/w %) using a homogenizer (Sonics VC130PB, output wattage 6 W), giving a final volume ratio of $H_2O$/ethanol of 12.5:1. The dispersion was homogenized for another 10 min and then transferred into a water-jacketed flask equipped with a thermometer, a condenser, a magnetic stirrer, and a nitrogen inlet. The dispersion was purged with nitrogen for 20 min and stirred at 80° C. prior to the addition of MMA (0.6 g) and TBHP (final concentration was 0.1 mM). The resulting mixture was continuously stirred at 80° C. for 2 hours under nitrogen. After the reaction, the particle dispersion was filtered to remove precipitates (if any) generated during the polymerization. The MMA conversion (conv %) was determined gravimetrically. The particle dispersion was purified by a repeated centrifugation (13,000 rpm), decantation, and redispersion cycle until the conductivity of the supernatant was close to that of distilled water used.

Figure 5:
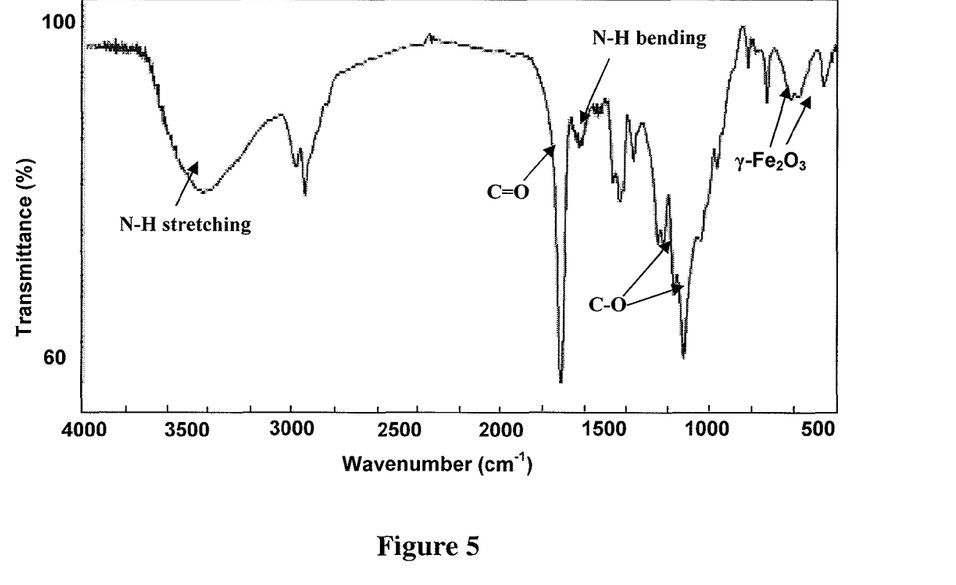
FIG. 5 shows the infrared (IR) spectrum of magnetic composite particles, wherein the hydrophobic core contains poly(methyl metharylate) (PMMA) and vinylic coated gramaphase iron oxide (MPS-$Fe_2O_3$) nanoparticles.

In order to determine the chemical composition of the magnetic composite particles, the purified particles was dried, and then identified with Fourier-transform infrared (IR) spectroscopy. The results are graphical illustrated in FIG. 5. IR spectrum of the purified magnetic composite particles shows a broad N—H peak of chitosan at 3400 $cm^{-1}$, a strong carbonyl peak (C=O) of PMMA at 1735 $cm^{-1}$, N—H bending peaks of the chitosan between 1550 and 1600 $cm^{-1}$, ester peaks (—C—O—) of PMMA between 1247 and 1272 $cm^{-1}$, and $\gamma$-$Fe_2O_3$ absorption peaks between 400 and 600 $cm^{-1}$. The IR spectrum clearly verifies that the purified magnetic composite particles are composed of chitosan, PMMA and $\gamma$-$Fe_2O_3$.

To confirm the formation of both magnetic, PMMA graft composites and PMMA homopolymers and to determine their compositions, the dispersion of magnetic composite particles is freeze-dried. The resulting brown solids are then

TABLE 1

Radical initiators for the graft copolymerization of MMA from chitosan in the presence of vinylic coated magnetic nanoparticles.

| Initiator | Chitosan:MMA:vinylic coated nanoparticles | Conv. % | $D_v$ | $D_v/D_n$ | Chitosan graft % | $\gamma$-$Fe_2O_3$ % |
|---|---|---|---|---|---|---|
| TBHP | 2.5:6:1 | 92 | 194 | 1.13 | 33 | 7 |
| $H_2O_2$ | 2.5:6:1 | 78 | 202 | 1.09 | 40 | 8 |

Conv. % represents monomer conversion;
Dv represents volume average hydrodynamic diameter;
Dn represents number average hydrodynamic diameter;
Chitosan graft % is determined by extraction of crude product using 1% acetic acid as a solvent in a Soxhlet extraction;
$\gamma$-$Fe_2O_3$ % is determined by thermogravimetry analysis.

Reaction conditions: 25 g of reaction mixture contains 22.5 g distilled water, 0.25 g water-soluble polymer, 0.6 g of purified MMA monomer, 0.05 g of magnetic nanoparticles containing ethanol (2 mL) and an appropriate concentration of initiator. Reaction took place at 80° C. for 2 h under $N_2$.

The mole ratio of vinylic monomer to catalyst can be more than 1000:1 In one embodiment, the mole ratio is 2400:1.

Figure 6:
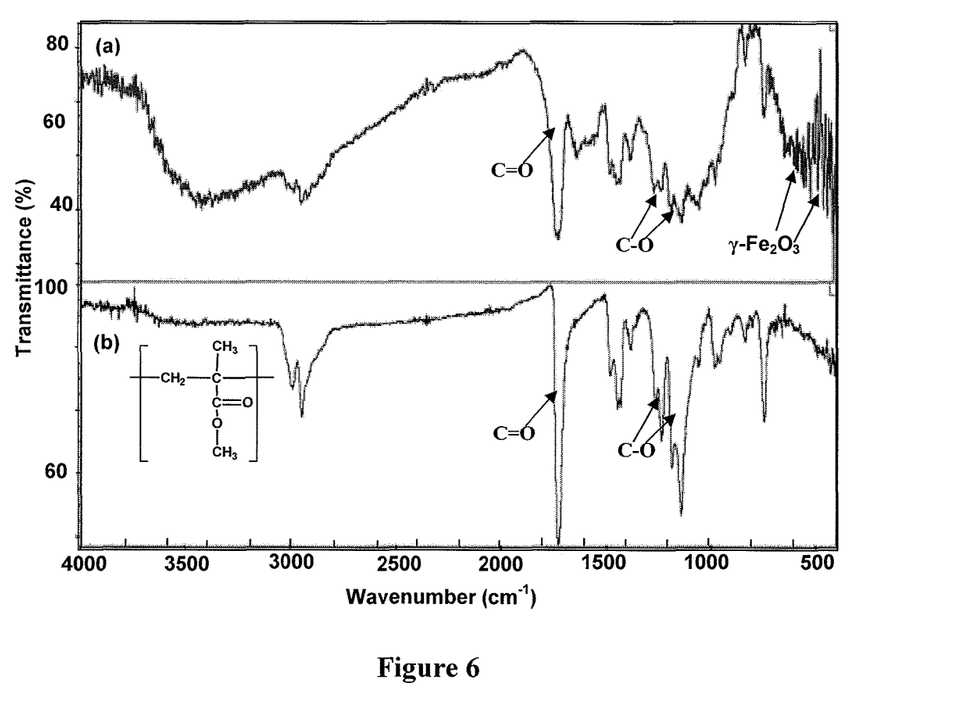
FIG. 6 shows the IR spectra of (a) isolated magnetic, PMMA graft copolymer composites using chloroform as a solvent in a Soxhlet extraction and (b) isolated PMMA after extraction.

The reaction might proceed at ambient temperature, but usually an elevated temperature is more effective, typically 60 to 95° C. In one embodiment, the reaction proceeds at a temperature of from 60 to 85° C. for a period of 1 to 4 hours under an appropriate atmosphere such as nitrogen.

subjected to the chloroform extraction for 48 h. PMMA homopolymer dissolved in chloroform is separated from the insoluble magnetic, PMMA graft copolymer that remained inside the thimble. The amounts of both PMMA dissolved in chloroform and insoluble polymer composites are determined gravimetrically. The PMMA homopolymer and the PMMA graft were 12% and 88%, respectively. Such a high percentage of the PMMA graft is may be attributed to the presence of reactive methacrylate groups of the vinylic coated grama-phase iron oxide nanoparticles. Since these reactive groups are close to chitosan due to the interaction between the vinylic coated nanoparticles and chitosan, their copolymerization with MMA enhances the chance of grafting from/onto the chitosan chains. The isolated magnetic, chitosan/PMMA graft composites are further identified with IR analyses. The results are graphically illustrated in FIG. 6. The spectrum clearly illustrates the characteristic peaks of PMMA such as the carbonyl peak at 1735 cm$^{-1}$ and the ester peaks between 1247 and 1272 cm$^{-1}$.

Figure 7:
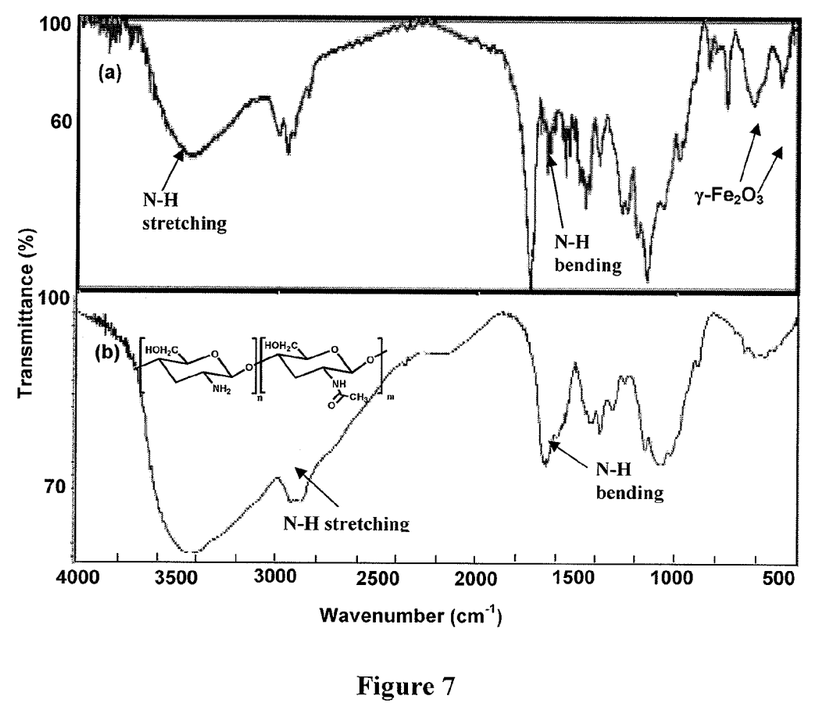
FIG. 7 shows the IR spectra of (a) isolated magnetic, chitosan grafted copolymer composites using a 1 v/v % of acetic acid solution as a solvent in a Soxhlet extraction and (b) isolated chitosan after extraction.

To separate both magnetic, grafted chitosan copolymers and un-grafted chitosan in the copolymer composites and determine their compositions, the freeze-dried magnetic composite particles were extracted with a 1 v/v % of acetic acid solution for 48 h. Un-grafted chitosan dissolved in an acetic acid solution, is separated from the insoluble magnetic graft copolymer composites which remained in the thimble. The actual amounts of chitosan dissolved in an acetic acid solution and those that are insoluble are determined gravimetrically. The un-grafted chitosan and grafted chitosan were 62% and 38%, respectively. In other words, there is 62% of the charged chitosan, which do not take part in the grafting reaction. It is either dissolved in solution or is adsorbed on the resulting particles. The isolated magnetic, grafted chitosan copolymer composites are further characterized with IR analyses. The results are graphically illustrated in FIG. 7, which shows the characteristic peaks of chitosan, which are the amine peak of chitosan at 3400 cm$^{-1}$ and the N—H bending of chitosan between 1550 and 1600 cm$^{-1}$. This result indicates that chitosan is grafted onto the graft copolymer composites.

Figure 8:
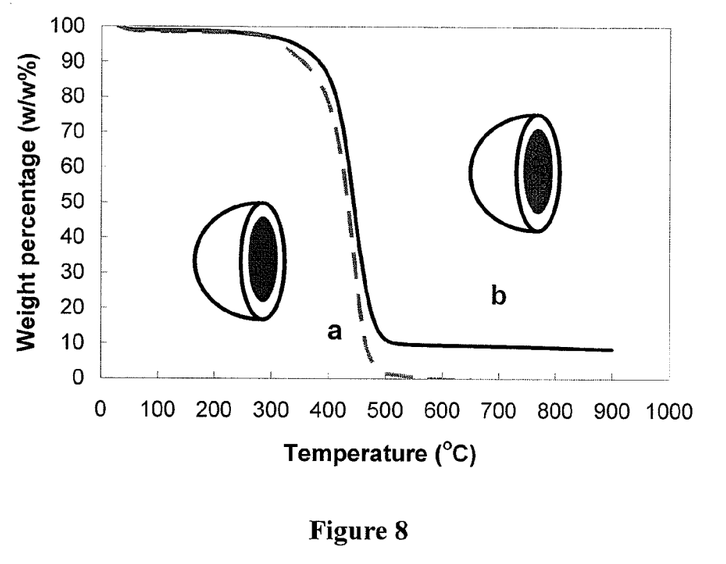
FIG. 8 shows the thermogravimetry analysis (TGA) thermograms of (a) PMMA/chitosan core-shell particles without encapsulated magnetic nanoparticles, and b) magnetic composite particles (containing 8.4 w/w % of $\gamma$-$Fe_2O_3$).

In order to characterize the weight percentage of the magnetic nanoparticles, a Thermogravimetric Analyzer (TGA) is used to measure the weight and to monitor the weight change of the magnetic composite particles as a function of decomposition temperature. FIG. 8 shows the TGA thermogram of PMMA/chitosan core-shell particles, showing a complete weight loss at above 500° C. For the magnetic composite particles, the thermogram shows that there is 85% weight loss from 380 to 500° C., which is due to the loss of polymers. However, there is 8.4% weight remained at 900° C., which is probably attributed to the presence of $\gamma$-Fe$_2$O$_3$ nanoparticles, since magnetic nanoparticles have a high thermal stability below 1000° C. [ref.].

Based on the monomer conversion, the Soxhlet extraction of ungrafted chitosan and the TGA of encapsulated $\gamma$-Fe$_2$O$_3$, the compositions of the magnetic composite particles were determined. The magnetic core-shell particles contained 65 w/w % of PMMA cores, 27 w/w % of chitosan, and 8 w/w % of $\gamma$-Fe$_2$O$_3$, respectively.

Figure 9A:
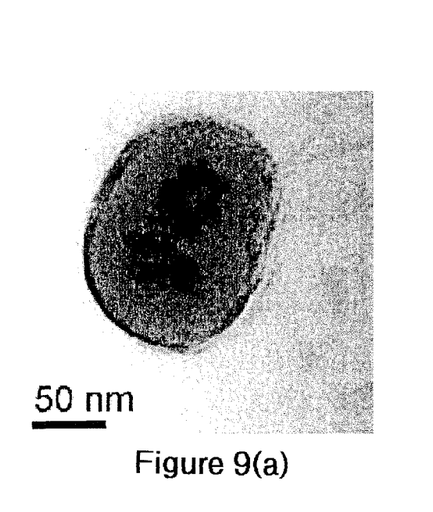
Figure 9B:
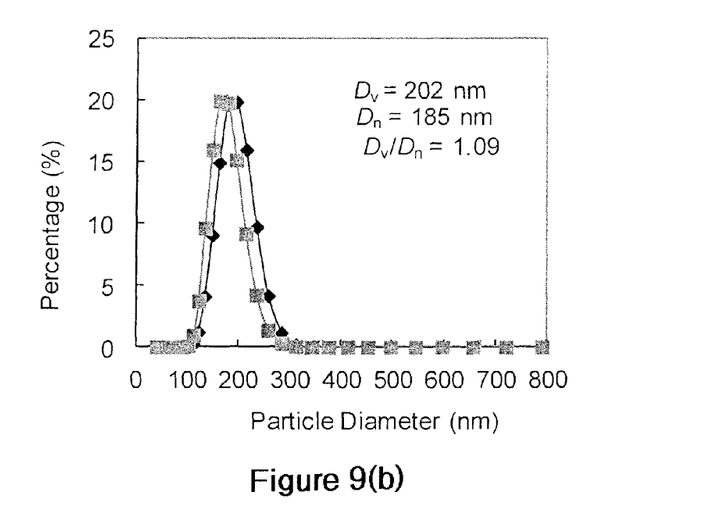

FIG. 9(a) displays a transmission electron microscope (TEM) image of a representative magnetic composite particle wherein poly(methyl methacrylate) (PMMA) is the hydrophobic polymer core synthesized using the typical recipe. The magnetic composite particles comprise core and shell, wherein the hydrophobic PMMA core contained magnetic nanoparticles and coated with chitosan as a shell. Particle size measurement indicated that an average particle diameter $D_n$ of 185 nm with $D_x/D_n$ 1.09 is formed (FIG. 9(b)).

Figure 10:
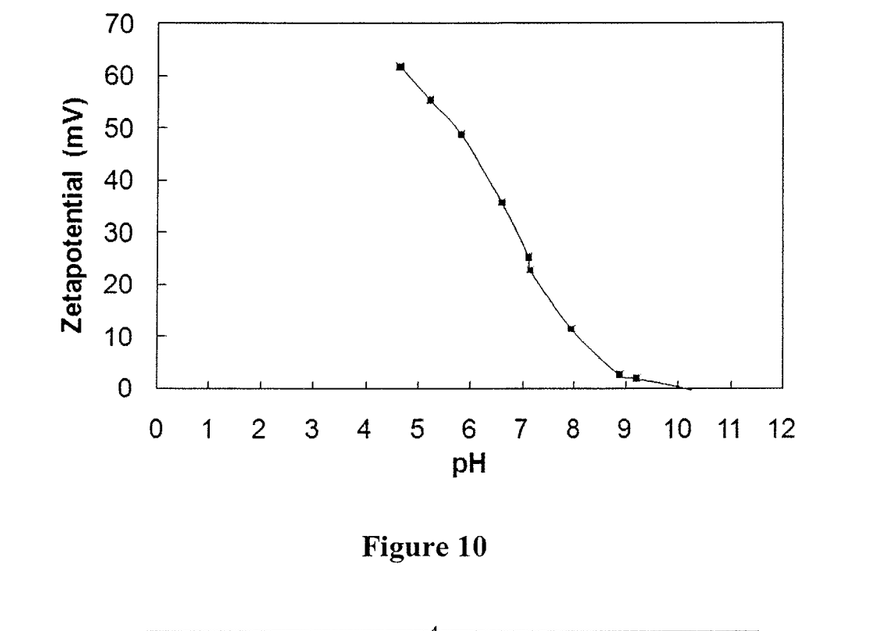
FIG. 10 shows pH dependence of zeta-potential of the magnetic composite particles.

The presence of chitosan shells was verified by ζ-potential measurements as a function of pH in a 1 mM NaCl solution at 25° C. FIG. 10 shows that the positive ζ-potential of MCS particles decreases from +50 to 0 mV as the pH increases from pH 3.0 to 8.0. This effect is probably due to the deprotonation of quaternary ammonium ions of chitosan.

Figure 11:
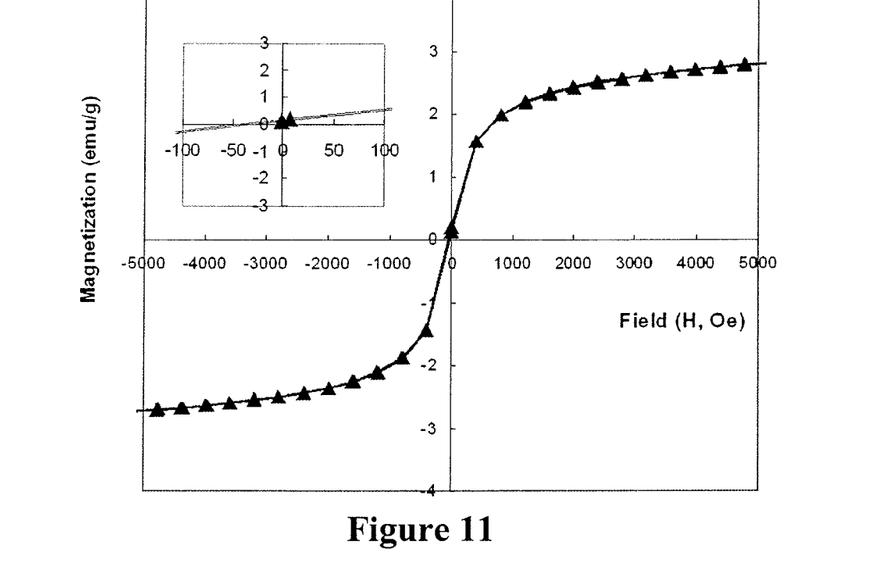
FIG. 11 shows the room temperature magnetization measurement of the magnetic composite particles with a 8 w/w % of $\gamma$-$Fe_2O_3$ content.

FIG. 11 shows the magnetic property of the particles measured by applying external magnetic fields from 0 to 5 KA/m using a VSM. Results indicated that the MCS particles exhibited superparamagnetic properties at room temperature since the data from both scans were completely overlapped without a hysteresis loop. The $M_s$ value was 2.7 emu/g, which is comparable to magnetic polymeric particles produced by other encapsulation methods such as seeded precipitation and microemulsion polymerization (1-3 emu/g latexes).

Figure 12:
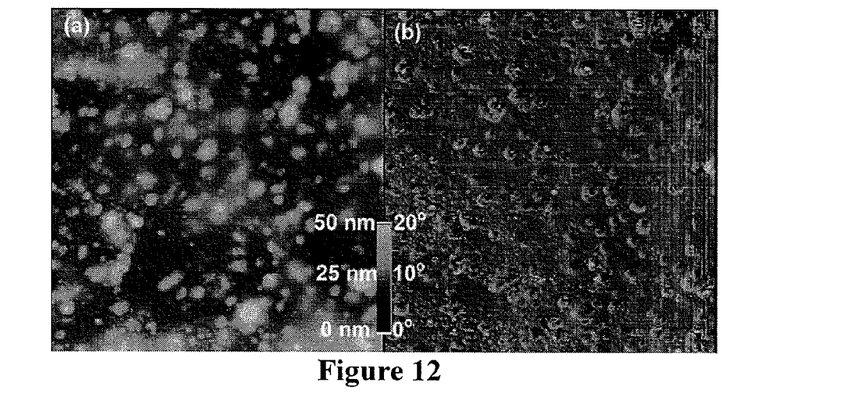
FIG. 12 shows the images of film formation of magnetic composite particle through annealing the magnetic composite particle dispersion at 155° C.: (a) is a surface topographic image (5 μm×5 μm) and (b) is a top view of magnetic force microscopy image (5 μm×5 μm).

The film-forming properties of the magnetic composite particles on a glass substrate were evaluated by AFM. Since PMMA has a glass transition temperature (Tg) of 105° C., the film-forming process is expected to occur at annealing temperatures higher than its Tg. Examination of different annealing temperatures from 130 to 155° C. for film formation of the composite particles suggested that the best film formed at 155° C. The AFM topographic image of the film in FIG. 12(a) clearly illustrates that there were no individual magnetic composite particles, suggesting that particle deformation occurred at 155° C. Statistical analyses of the topographic image indicated that the average height of the film was 45±28 nm. FIG. 12(b) shows the MFM image of the film. The out-of-plane spheres corresponding to the position of the particles in the topographic image are the magnetic signals. These signals are evenly distributed throughout the film, suggesting that the core-shell particles are able to prevent magnetic nanoparticles from aggregation during the film-forming process. This property may have promising potential for various applications.

Figure 13:
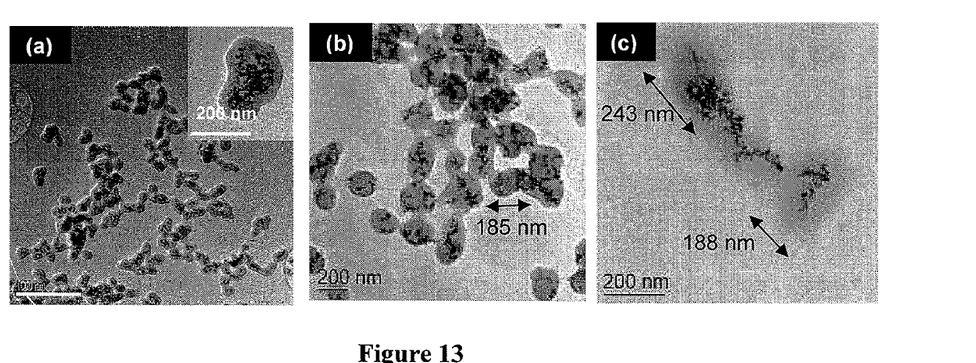
FIG. 13 shows transmission electron microscopy images of the magnetic composite particles with different core components: (a) hard (PMMA) (b) soft (a mixture of PBA and PMMA) and (c) temperature sensitive (PNIPAM with 10% crosslinking), according to the invention.

Multi-functional particles that are able to alter their physical and chemical properties in response to environmental stimuli, such as pH, temperature, and magnetic field, are attractive candidates for many potential applications, including drug delivery, biosensor, affinity separation, enzyme immobilization, and soft actuators. To demonstrate the versatility of the invention for the preparation of multi-functional core-shell particles, two types of vinyl monomers such as n-butyl acrylate (BA) and N-isopropyl acrylamide (NIPAM) were examined (FIG. 13).

The present method is very efficient for the encapsulation of magnetic nanoparticles into the PMMA/chitosan particles. The following is a list of important features with respect to the synthetic method and particle properties:

1. The synthesis is carried out in water. Stable magnetic composite particles are produced in the absence of surfactants and toxic solvent agents. Thus, it is an environmentally benign method.
2. The diameters of MCS particles ranging from 100 nm to 400 nm can be easily tailored by varying monomer concentration.
3. The particles are biocompatible, and contain a considerable amount of surface amino groups which can be easily modified to other functionalities.
4. The magnetic composite particles possess a good film-forming ability. A smooth and uniform magnetic thin-film with a thickness around 5 μm coated on a glass substrate can be easily produced by thermal annealing the magnetic composite particles. Magnetic nanoparticles with sizes between 60 and 80 nm were found to evenly distribute within the polymer matrix. In other words, the amphiphilic structure of the composite particles is able to prevent magnetic nanoparticles from aggregation during film forming process, which is a long standing problem.
5. The synthetic method is a versatile route to a variety of magnetic composite particles which have different core properties such as hard (PMMA), soft poly(n-butyl acrylate) (PBA) or temperature-sensitive poly(N-isopropyl acrylamide) (PNIPAm). Thus, tailor-made of the composite particles with different core compositions and properties can be prepared for specific applications.

What is claimed is:

1. A process for making amphiphilic magnetic composite particles, the process comprising, sequentially:
   forming magnetic nanoparticles from a solution of metal salts and coating the nanoparticles with a carboxylic acid to produce acid-modified magnetic nanoparticles;
   coating the acid-modified magnetic nanoparticles with a silanol precursor in an alkaline solution to produce precursor-coated magnetic nanoparticles;
   adding a silane coupling agent including a vinylic group to a dispersion of the precursor-coated magnetic nanoparticles and coating the precursor-coated magnetic nanoparticles to form vinylic-coated magnetic nanoparticles; and
   encapsulating the vinylic-coated magnetic nanoparticles by homogenizing a dispersion of the vinylic-coated magnetic nanoparticles with an aqueous solution of a water-soluble polymer containing amino groups, a peroxide, and a monomer, graft copolymerizing the monomer to encapsulate the vinylic-coated magnetic nanoparticles in cores, and shells covering the cores, thereby forming the amphiphilic magnetic composite particles.

2. The process of claim 1, wherein the water-soluble polymer is a natural or synthetic water-soluble polymer containing amino groups.

3. The process of claim 1, wherein weight of the monomer is from 25% to 95% of total weight of the magnetic composite particles.

4. The process of claim 1 further comprising
   generating radicals on nitrogen atoms of the water-soluble polymer, and
   initiating free-radical copolymerization of the monomer and the vinylic-coated magnetic nanoparticles, whereby the vinylic-coated magnetic nanoparticles are encapsulated in cores inside polymer shells.

5. The process of claim 1, wherein the monomer is hydrophobic and is selected from the group consisting of a hydrophobic vinylic monomer, an acrylate monomer, an acrylamide monomer, polymerizable nitrile, acetate, chloride monomers, and a styrenic monomer.

6. The process of claim 1, wherein the monomer has the formula $R^1R^2C\!=\!CH_2$, where $R^1$ is hydrogen or alkyl, and $R^2$ is alkyl, aryl, heteroaryl, substituted aryl, halo, or cyano.

7. The process of claim 1, wherein the monomer has the formula $CH_2\!=\!CR^3COOR^4$, where $R^3$ is hydrogen or alkyl, and $R^4$ is alkyl or substituted alkyl.

8. The process of claim 1, wherein the monomer has the formula $CH_2\!=\!CR^3COONHR^4$, where $R^3$ is hydrogen or alkyl, and $R^4$ is alkyl or substituted alkyl and the monomer is water insoluble.

9. The process of claim 1, wherein the monomer has the formula $CH_2\!=\!CR^1\!-\!CH\!=\!CH_2$, where $R^1$ is hydrogen or alkyl or chloro.

10. The process of claim 1, wherein the monomer has the formula $CH_2\!=\!CR^1CONR^2$, where $R^1$ is hydrogen or alkyl, and $R^2$ is alkyl or substituted alkyl or a hydrophobic group.

11. The process of claim 1, wherein the carboxylic acid comprises trisodium citrate.

12. The process of claim 1, wherein the silane coupling agent is chosen from the group consisting of 3-(trimethoxysilyl)propylmethacrylate, (3-methyldiethoxysilyl)propyl methacrylate, (3-triethoxysilyl)propyl 2-propenoate, (trimethoxysilyl)methyl methacrylate, and (triethyoxysilyl)methyl methacylate.

13. The process of claim 1, wherein weight of the magnetic nanoparticles is from 5% to 30% of total weight of the magnetic composite particles.

14. The process of claim 1, wherein the water-soluble polymer is present in an amount between 5% and 20%, based on total weight of magnetic composite particles.

15. The process of claim 1, wherein the peroxide is an alkyl hydroperoxide or hydrogen peroxide.

16. The process of claim 1, wherein molar ratio of the monomer to the peroxide is more than 1000:1.

17. The process of claim 1 including graft copolymerizing in the absence of a surfactant.

18. The process of claim 1, wherein the silanol precursor is chosen from the group consisting of tetramethyl orthosilicate, tetraethyl orthosilicate, mtetrapropyl orthosilicate, tetrabutyl orthosilicate, methyl polysilicate, and ethyl polysilicate.

19. The process of claim 1, wherein the water-soluble polymer containing amino groups is chitosan.

* * * * *